Oct. 2, 1951     G. B. PARSONS     2,569,617
RESILIENT CAR WHEEL

Filed March 7, 1947     3 Sheets-Sheet 1

INVENTOR.
George B. Parsons
BY
Robert A. Shields
Attorney

Oct. 2, 1951   G. B. PARSONS   2,569,617
RESILIENT CAR WHEEL
Filed March 7, 1947   3 Sheets-Sheet 2
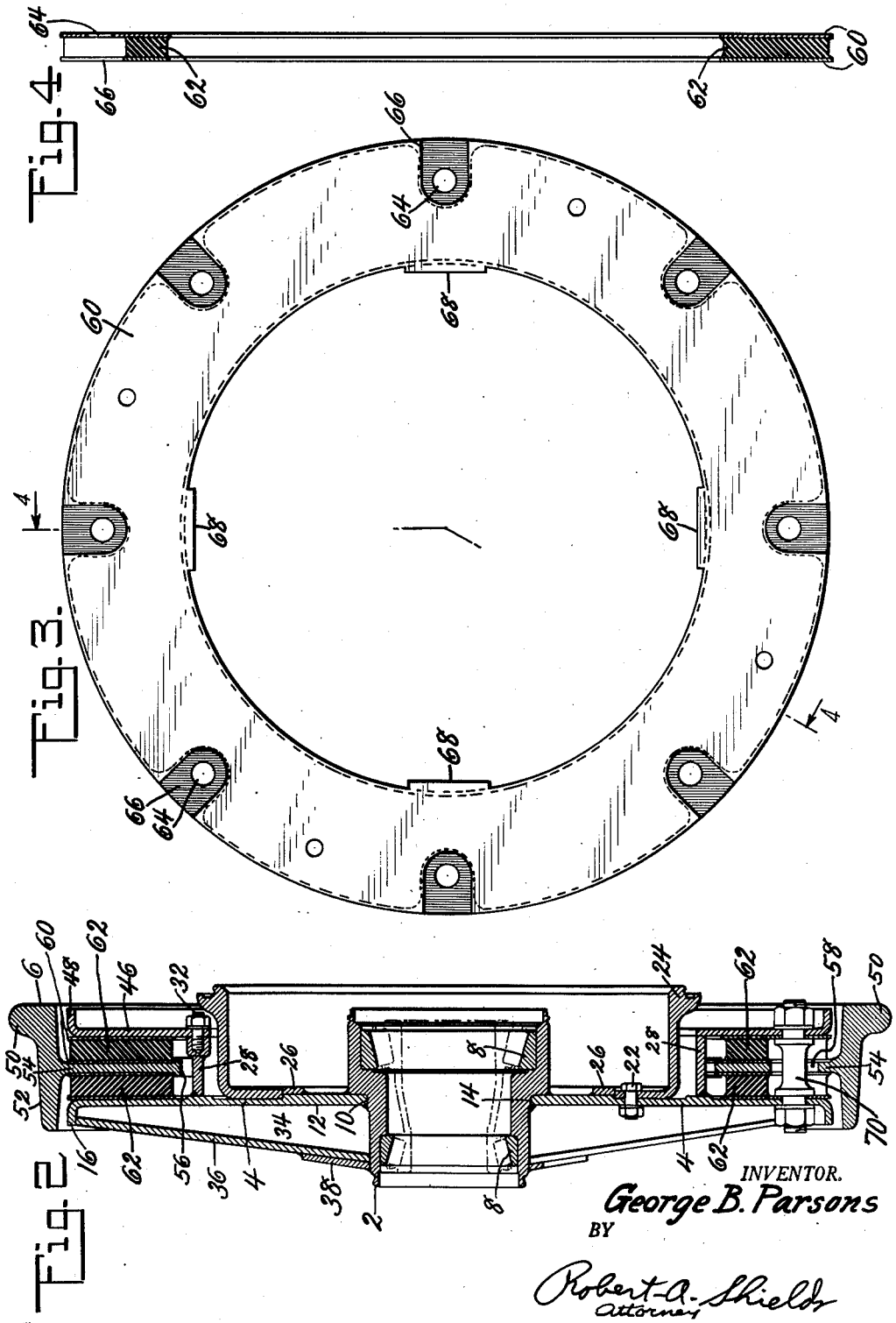
INVENTOR.
George B. Parsons
BY
Robert A. Shields
Attorney Oct. 2, 1951   G. B. PARSONS   2,569,617
RESILIENT CAR WHEEL
Filed March 7, 1947   3 Sheets-Sheet 3
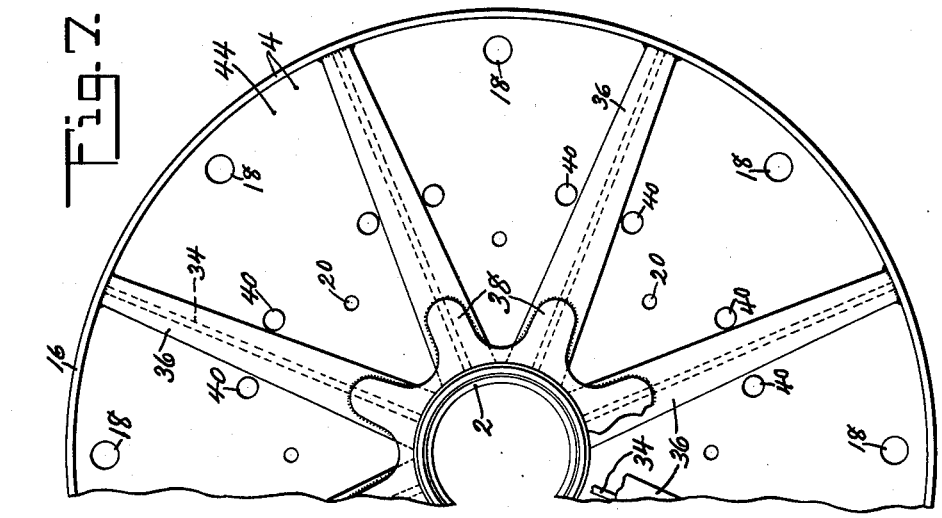
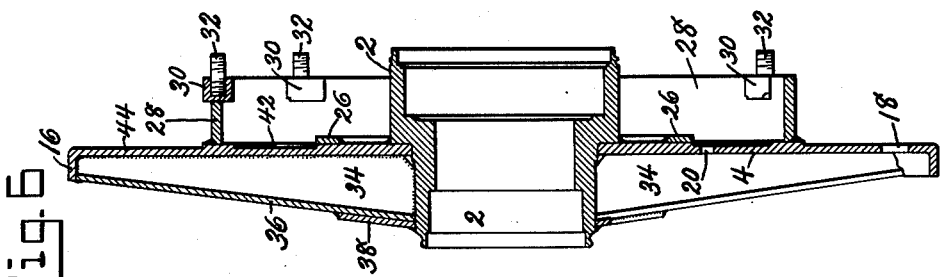
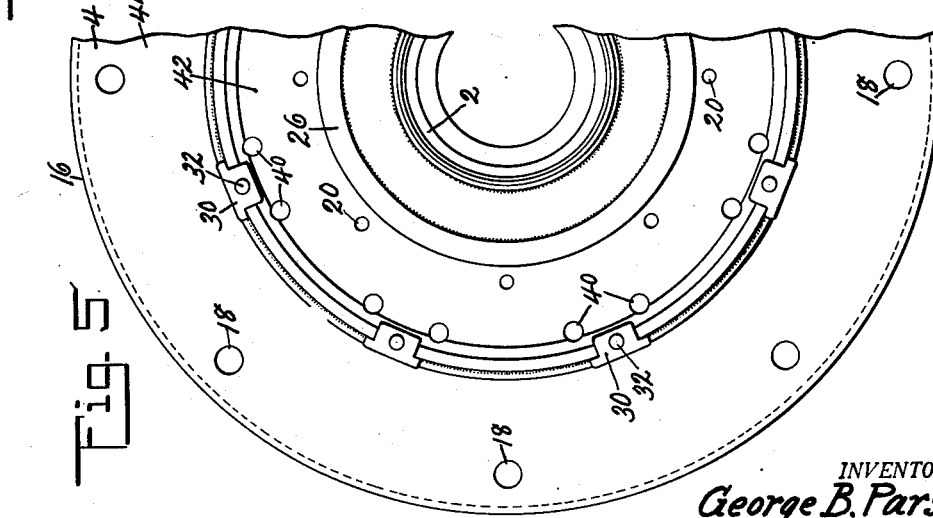
INVENTOR.
George B. Parsons
BY
Robert A. Shields
Attorney Patented Oct. 2, 1951

2,569,617

UNITED STATES PATENT OFFICE 2,569,617

RESILIENT CAR WHEEL

George B. Parsons, Roosevelt, N. Y., assignor to American Car and Foundry Company, New York, N. Y., a corporation of New Jersey Application March 7, 1947, Serial No. 733,113

6 Claims. (Cl. 295—11)

This invention relates to wheels in general and in particular to light weight wheels of the resilient type.

Railway wheels for main line service have of necessity been made solid since the load which they had to carry with standard equipment was too great to permit the use of light weight wheels or wheels which would resiliently carry the load and prevent transmission of rail joint shock to the car body. Recently main line equipment has been designed which is of sufficiently light weight as to permit use of a resilient type wheel. The resilient type wheel as built at present utilizes castings and is much heavier than necessary. It is an object, therefore, of the present invention to build a resilient car wheel making use of plate metal of high tensile strength.

A further object of the invention is the provision of a resilient car wheel, the bulk of which is made from high tensile plate members welded together to best withstand the strains.

A still further object of the invention is the provision of a resilient car wheel which may be quickly assembled or disassembled and which utilizes resilient material in shear to absorb rail shocks.

These and other objects of the invention will be apparent to persons skilled in the art from a study of the following description and accompanying drawings, in which Fig. 1 is an elevational view of the improved wheel as viewed from the outside;

Fig. 2 is a sectional view taken substantially on line 2—2 of Fig. 1;

Fig. 3 is an elevational view of one of the resilient units;

Fig. 4 is a sectional view taken substantially on line 4—4 of Fig. 3;

Fig. 5 is an elevational view of substantially one-half the wheel but with parts removed to better show the construction;

Fig. 6 is a sectional view similar to Fig. 2 but with parts removed to better disclose the construction, and Fig. 7 is an elevational view of substantially one-half the wheel as viewed from the outside.

Figure 1:
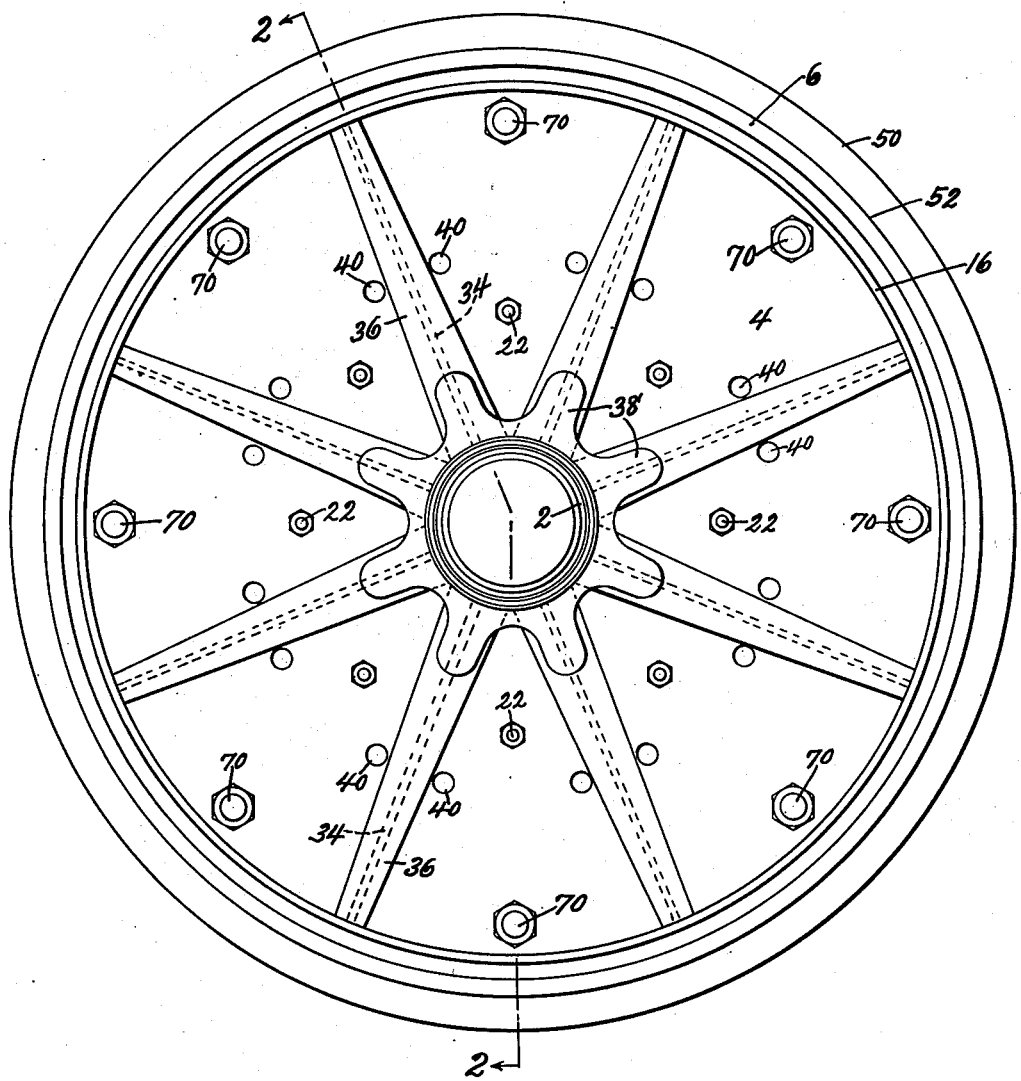

Referring now to the drawings in detail it will be seen that the wheel is made up in general of three major parts, namely, the hub 2, the plate portion 4 and the tire 6. The hub 2 may either be made as a casting, a forging or shaped from a solid steel bar or heavy tube, but as most clearly shown in Figs. 2 and 6 it is provided with internally stepped surfaces to receive bearing races 8 and is also stepped externally as at 10 to provide an abutting surface against which the plate member may be seated and welded in place.

The plate member 4 is of general pan shape having a flat central portion 12, a central opening 14 through which the hub may project, and an outwardly turned flange 16 located at the periphery of the plate. The outer portion of the plate with its flange 16 will form in effect a fixed felly member and is pierced as at 18 to receive clamping members later to be referred to. The pan shaped plate is also pierced as at 20 to receive fastening means 22 by means of which the brake drum 24 may be clamped in position. The pan shaped plate is stiffened by a ring 26 welded thereto and forming a reinforcing and guide member for the brake drum, while outwardly of the drum the plate is stiffened by a ring member 28 edge-welded to the inner surface of the plate member 4. This ring member 28 has notches cut therein at spaced points and enlarged lugs 30 welded or otherwise secured in the notches and adapted to receive stud bolts 32. On the outer surface of the pan shaped plate wedge shaped plate members 34 are edge-welded to the plate, to the flange 16 and to the projecting hub portion. These wedge shaped plates 34 are likewise edge-welded to tapering plates 36 which are welded to the projecting hub and to the outer portion of flange 16. Thus the plates 34 and 36 provide spokes of T cross-section bracing the pan shaped plate and assisting in transmitting load between the fixed felly portion and the projecting hub. The connection between the projecting hub and spokes is braced by means of a star shaped gusset plate 38 welded to the projecting hub and to the spoke plates 36. In order to assist in cooling the brake drum openings 40 are placed in the pan shaped plate on either side of the T shaped spokes which will act similar to fan blades in causing a flow of air past the brake drum. This entire assembly as just described and best shown in Figs. 5, 6 and 7 can be made up as a sub-assembly and after fabrication the brake drum receiving surface 42 and the resilient unit receiving surface 44 will be turned or ground to provide a flat true surface for reception of the drum and resilient unit.

In order to grip the resilient units and carry the load a removable felly member 46 is provided. This disk-like removable felly member is provided with an inturned flange 48 and has the disk portion pierced so as to fit over the stud bolts 32 and be clamped to the ring member 28, thus the fixed felly portion and the removable felly portion, together with the ring 28, form an outwardly open U-shaped recess. The disk portion of the removable felly member is also pierced in alignment with the holes 18 of plate 4 in order to receive the clamping members later to be referred to.

The tire portion 6 of the wheel may be made as a forging or cast but, however made, is provided with a flange 50, a tread surface 52 and an inwardly projecting web 54 which has its side surfaces machined sufficiently as to provide true bearing surfaces for the resilient units and also so as to give a slight T head on its inner periphery as indicated at 56 in Fig. 2. The tire web is pierced at a plurality of points to provide openings 58 and these openings are of sufficient size as to prevent contact between the wheel web and the clamping means later to be referred to.

The resilient units, best shown at Figs. 2, 3 and 4, are made up of metal disks 60 to which are vulcanized or otherwise attached annular rings 62 of resilient material such as rubber. The disks are of substantially the same design except that the disks adapted to contact the fellies are pierced as at 64, while the disks adapted to contact the tire web are notched as at 66. The disks which contact the tire web are provided with a plurality of projecting lugs 68 which contact suitable surfaces on the tire web and prevent rotational movement between the disk and the tire web. As clearly shown in Fig. 2 the resilient units are placed in the outwardly opened U-shaped recess on either side of the tire web and fastening means 70 extends through the openings 18 in the fixed felly member and through similar openings in the removable felly member. These fastening or clamping means are of spool-like formation and, as clearly shown in Fig. 2, tightly grip the resilient unit disks and clamp them onto the fixed and removable fellies. The spacing between the shoulders of the clamping members is predetermined so as to place the resilient material 62 under a slight precompression.

In assembling the wheel the one resilient unit can be tightly clamped onto the fixed felly member, after which the tire may be lowered into position and the second resilient unit placed in position and finally the removable felly may be lowered into position and securely clamped to the wheel by means of the clamping members 70 and stud bolts 32. It is generally advisable to use pressure during the assembly so as to relieve the clamping devices 70 and stud bolts 32 of unnecessary strain. With the wheel finally assembled it will be seen that all load is resiliently carried by resilient material acting in shear. Due to the arrangement of the parts this material not only carries the vertical loads in shear but also all braking torque, and in case of drive wheels all driving torque. It will be apparent from the preceding description that an extremely strong yet light wheel has been produced having a minimum amount of unsprung weight and which can be constructed with a minimum outlay in machinery and tooling. It is, of course, obvious that slight changes and rearrangements of parts can be made, but all such modifications and rearrangements are contemplated as fall within the scope of the following claims.

What is claimed is:

1. A car wheel comprising, a hub member, a pan shaped plate having a central opening therein through which a portion of the hub member projects and to which said plate is attached, a tire portion having an inwardly extending web axially spaced with respect to said plate, a ring member attached to said plate in overlapping relationship to the inner edge of said web, a disk like felly member removably secured to the outer edge of said ring member in spaced relationship to the opposite side of said web from said plate, and annular disks of metal bonded to resilient material and forming annular units positioned in said spaces between said plate and web and between said felly member and web, said annular units resiliently transmitting loads from said hub member to said tire portion, and certain of said metal disks being formed with radially projecting lugs adapted to engage the inner edge of said web to transmit rotative forces.

2. The structure of claim 1 characterized in that clamping means extend freely through said web without contacting the same and join the outer portions of said felly member and plate whereby said resilient material may be compressed axially of the wheel to thereby maintain said lugs in engagement with the inner edge of said web.

3. A car wheel comprising in part, a hub member, a pan shaped member formed of plate metal having a central opening therein through which a portion of the hub member projects and to which said member is welded, said plate metal member having a flange turned outwardly adjacent its perimeter to stiffen said member, and a plurality of spokes welded to said plate metal member and to said projecting hub and flange, said spokes being of T cross-section with the arms thereof welded to said flange and projecting hub and of constantly decreasing cross-section from said hub to said flange.

4. A car wheel comprising in part, a hub member, a pan shaped plate having a central opening therein through which a portion of the hub member projects and to which said plate is welded, said plate having a flange turned outwardly adjacent its perimeter to stiffen said plate, a plurality of spokes welded to said plate and to said projecting hub and flange, said spokes being of T cross-section with the arms thereof welded to said flange and projecting hub, and a star like gusset plate having the central portion welded to said projecting hub and the points thereof overlapping the inner portions of the arms of the spokes and welded thereto.

5. A car wheel comprising in part, a hub member, a flat bottomed pan shaped plate having a central opening therein through which a portion of the hub member projects and to which said plate is welded, said plate having a flange turned outwardly adjacent its perimeter to stiffen said plate, a plurality of spokes welded to said plate and to said projecting hub and flange, said spokes being of T cross-section uniformly decreasing in height and width from the projecting hub outwardly to said flange, and a brake drum secured to said plate between said hub and flange but on the side opposite said spokes, said flat bottomed plate being formed with openings therethrough on either side of said spokes and adjacent said brake drum for circulation of air to said drum by said spokes.

6. A flanged car wheel comprising in part, a hub member, a flat bottomed pan shaped plate having a central opening therein through which a portion of the hub member projects and to which said plate is welded, said plate having a flange turned outwardly away from the flange of the wheel and adjacent the plate perimeter to stiffen said plate, a plurality of spokes welded to said plate and to said projecting hub and flange, an annular ring having an edge welded to said plate between said hub and plate flange but on the side opposite said spokes, a brake drum secured to said plate between said ring and hub on the side opposite said spokes and in spaced relation to said annular ring, and openings in said pan shaped plate for circulation of air to the space between said annular ring and brake drum.

GEORGE B. PARSONS.

REFERENCES CITED

The following references are of record in the file of this patent:

UNITED STATES PATENTS

| Number | Name | Date |
|---|---|---|
| 2,126,169 | Brownyer | Aug. 9, 1938 |
| 2,175,118 | Hirshfeld | Oct. 3, 1939 |
| 2,222,337 | Gordon | Nov. 19, 1940 |
| 2,290,661 | Williams | July 21, 1942 |
| 2,295,270 | Piron | Sept. 8, 1942 |

FOREIGN PATENTS

| Number | Country | Date |
|---|---|---|
| 757,033 | France | Dec. 19, 1933 |